United States Patent [19]
Baxter

[11] 3,958,705
[45] May 25, 1976

[54] METHOD FOR MOVING AND ALIGNING MODULAR HOUSE UNITS ONTO A FOUNDATION

[76] Inventor: Bobby G. Baxter, Rte. 3, Box 3, Warrenton, Mo. 63383

[22] Filed: July 22, 1974

[21] Appl. No.: 490,577

Related U.S. Application Data

[60] Division of Ser. No. 339,081, March 8, 1973, Pat. No. 3,887,083, which is a continuation-in-part of Ser. No. 216,204, Jan. 7, 1972, Pat. No. 3,794,186.

[52] U.S. Cl. ............................... 214/152; 214/1 H
[51] Int. Cl.² ......................................... B65G 67/24
[58] Field of Search .............. 214/1 H, 38 B, 38 BA, 214/38 BB, 517, 152; 238/13; 105/366 R, 368 B; 52/122, 745

[56] References Cited
UNITED STATES PATENTS
3,743,120  7/1973  Schmidt ........................ 214/1 H X

*Primary Examiner*—Robert G. Sheridan

[57] ABSTRACT

This invention relates to a system and method for placing a module unit on a site foundation. In accordance therewith means are provided for supporting a module unit alongside the foundation. Spaced tracks extend from between the module and support means across the foundation. Also included are first antifriction bearing means between the module and tracks for movement of the module along the tracks, second antifriction bearing means located between the module and the track for allowing transverse movement of the module relative to at least all but one of the tracks, and means between the first and second antifriction bearing means for providing rotation of the module unit relative to the tracks. Means are also provided for moving the module along the tracks.

6 Claims, 14 Drawing Figures

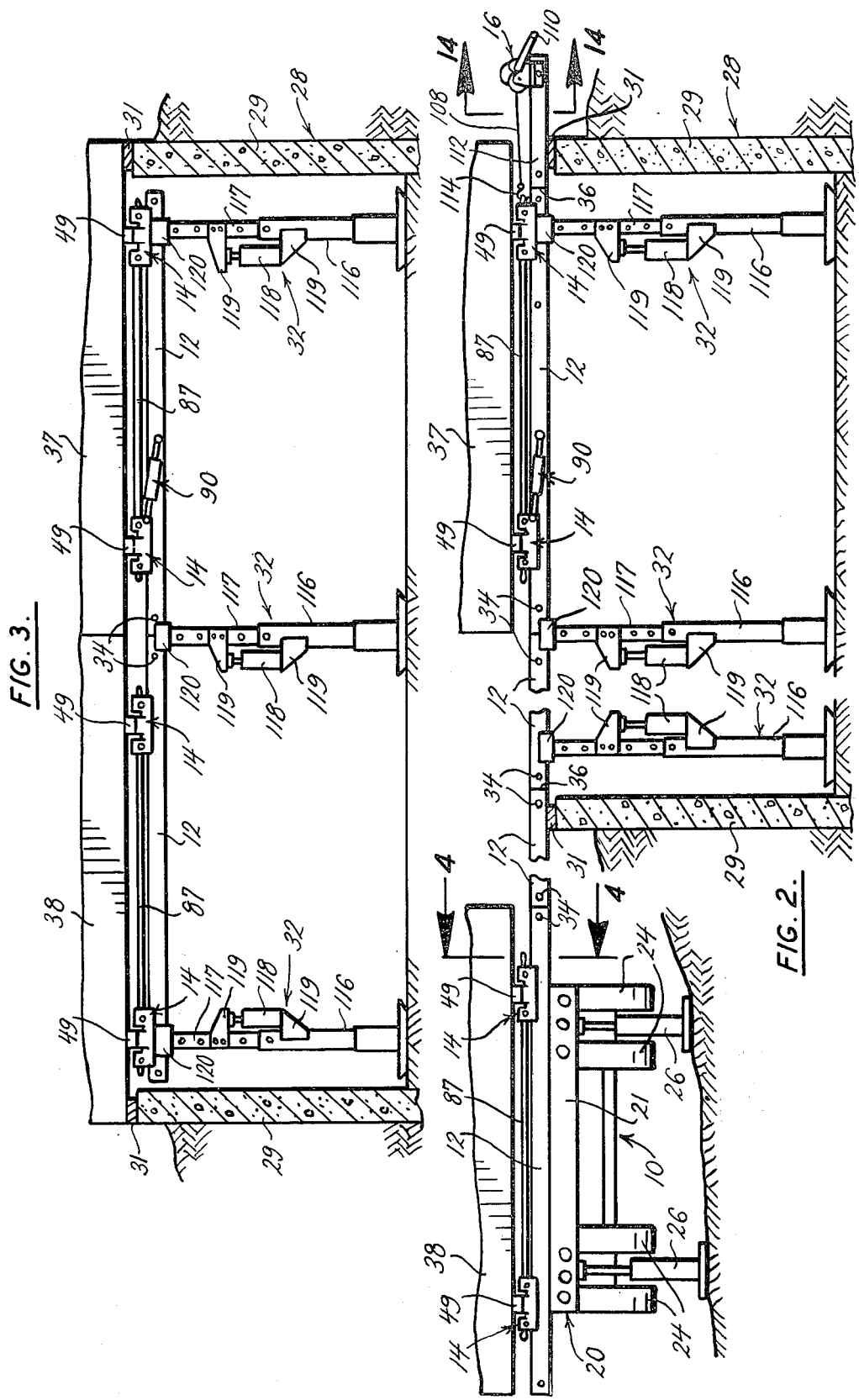

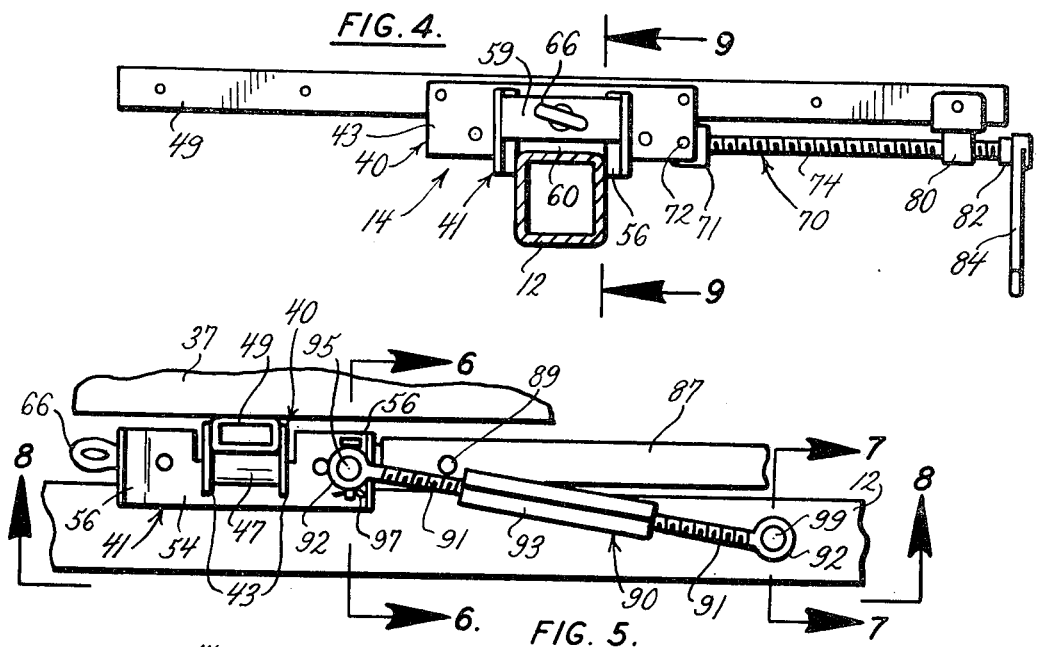
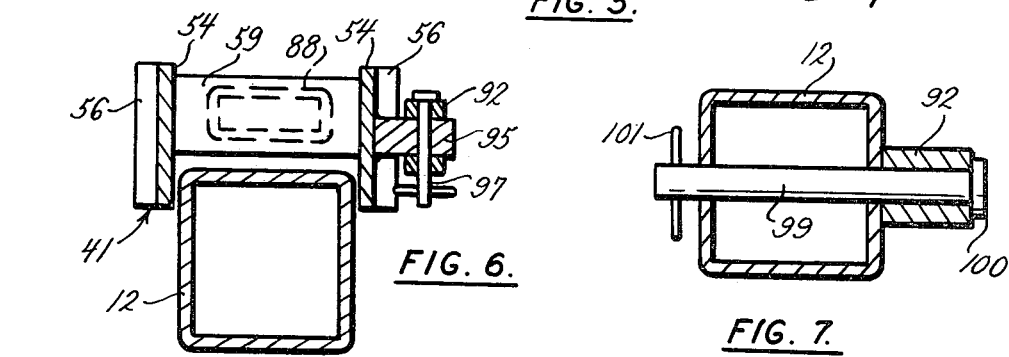
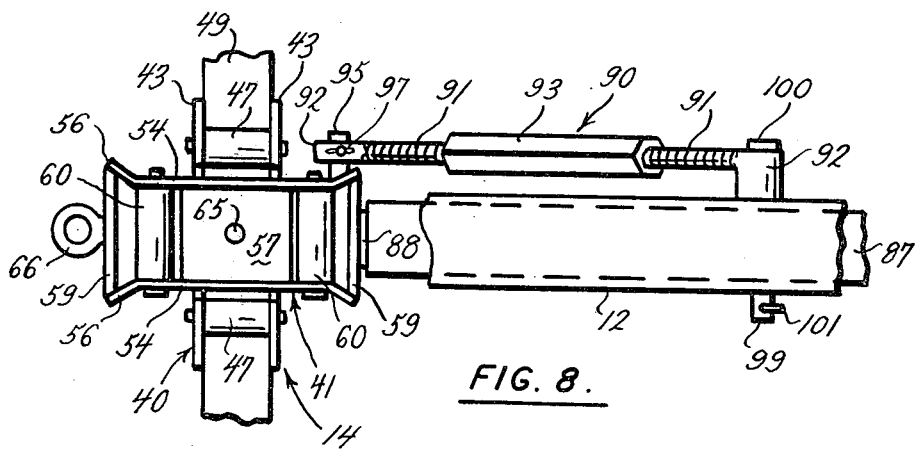

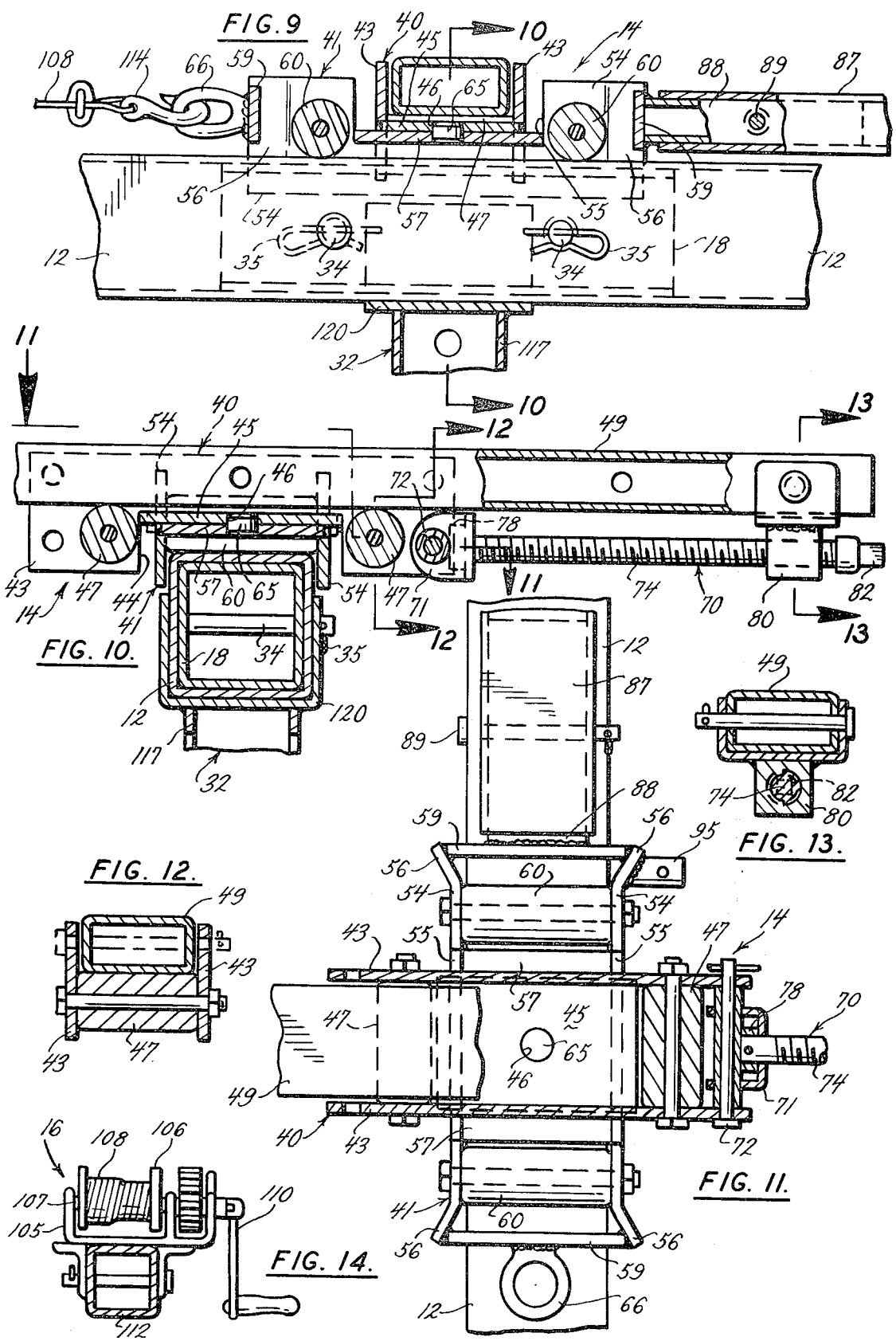

METHOD FOR MOVING AND ALIGNING MODULAR HOUSE UNITS ONTO A FOUNDATION

This is a division of application Ser. No. 339,081 filed March 8, 1973, now U.S. Pat. No. 3,887,083 which is a continuation-in-part of copending U.S. patent application Ser. No. 216,204, filed Jan. 7, 1972, now U.S. Pat. No. 3,794,186, and relates generally to the building arts and more particularly to a novel system and method for moving and aligning modular houses and the like onto foundations.

BACKGROUND AND SUMMARY OF THE INVENTION

Heretofore house modules have been transported such as by tractor trailer from a fabrication point to a foundation site, and thereafter various means have been employed to move and align the module onto the foundation. In one such means rails have been used together with rollers for rolling the modules over the rails and onto the foundation. While this system has proven superior to other types of systems used, it has had problems caused by binding of the rollers as they move along the rails due to the rails being nonparallel and/or not properly aligned with the house foundation. Even with very careful rail alignment, which is difficult and time consuming at the job site, these problems still occurred.

Even after the module was moved over the foundation, there were difficulties in aligning the module in precise manner with the foundation walls. The rollers themselves offered no latitude in movement, and therefore the procedure was basically to lower the module onto the foundation and then by using brute force techniques, such as with jacks, levers, and the like, attempt to shove the unit in proper alignment. This was time consuming, required several additional men and was imprecise.

Many of these problems were solved by the method and system disclosed in copending U.S. patent application Ser. No. 216,204, by the same inventor, filed Jan. 7, 1972, be effectively eliminating the binding problem caused by the rails being unparallel, and by providing a method and system for precisely aligning the module with the foundation both quickly and easily. This invention represents still another improvement in such system and method, providing adjustability were the rails are not properly aligned relative to the house foundation.

Generally, this invention comprises means for supporting a module unit alongside a site foundation, spaced tracks extending from between the module and support means across the foundation, and a plurality of roller pads mounted between the module and the tracks such that the module is supported on the pads. Generally, each pad includes an upper body section, a lower body section, and a roller track segment. First roller means are provided for supporting the lower body section for movement along the track. Second roller means are provided for supporting the roller track segment on the upper body section for transverse movement of the roller track segment relative to the tracks, the module being supported on the roller track segments. Means are also provided for mounting the upper body section on the lower body section for rotation relative thereto about a generally vertical axis.

Hence, in accordance with this invention, means are provided for allowing movement of the module along the track, transverse movement of the module relative to the tracks, and rotation of the module relative to the tracks about a generally vertical axis. The result is that the module can be quickly and easily moved from a support means alongside the foundation onto, and in precise alignment with, the foundation despite misalignment of the tracks and misalignment of the module relative to the foundation.

DESCRIPTION OF THE DRAWINGS

FIG. 2 is an enlarged view in section taken generally along the line 2—2 of FIG. 1;

FIG. 3 is a view similar to the right-hand portion of FIG. 2 as viewed from the end and beneath the foundation, and showing the modular units after being lowered into position on the foundation;

FIG. 4 is an enlarged view in section taken generally along the line 4—4 of FIG. 2;

FIG. 5 is an enlarged fragmentary view of the turnbuckle and roller pad assemblies portion of FIG. 2;

FIG. 6 is an enlarged view in section taken generally along the line 6—6 of FIG. 5;

FIG. 7 is an enlarged view in section taken generally along the line 7—7 of FIG. 5;

FIG. 8 is a view in section taken generally along the line 8—8 of FIG. 5;

FIG. 9 is an enlarged view in section taken generally along the line 9—9 of FIG. 4;

FIG. 10 is a view in section taken generally along the line 10—10 of FIG. 9;

FIG. 11 is a view in section taken generally along the line 11—11 of FIG. 10;

FIG. 12 is a view in section taken generally along the line 12—12 of FIG. 10;

FIG. 13 is a view in section taken generally along the line 13—13 of FIG. 10; and FIG. 14 is an enlarged view in section taken generally along the line 14—14 of FIG. 2.

DETAILED DESCRIPTION OF A PREFERRED EMBODIMENT

Figure 1:
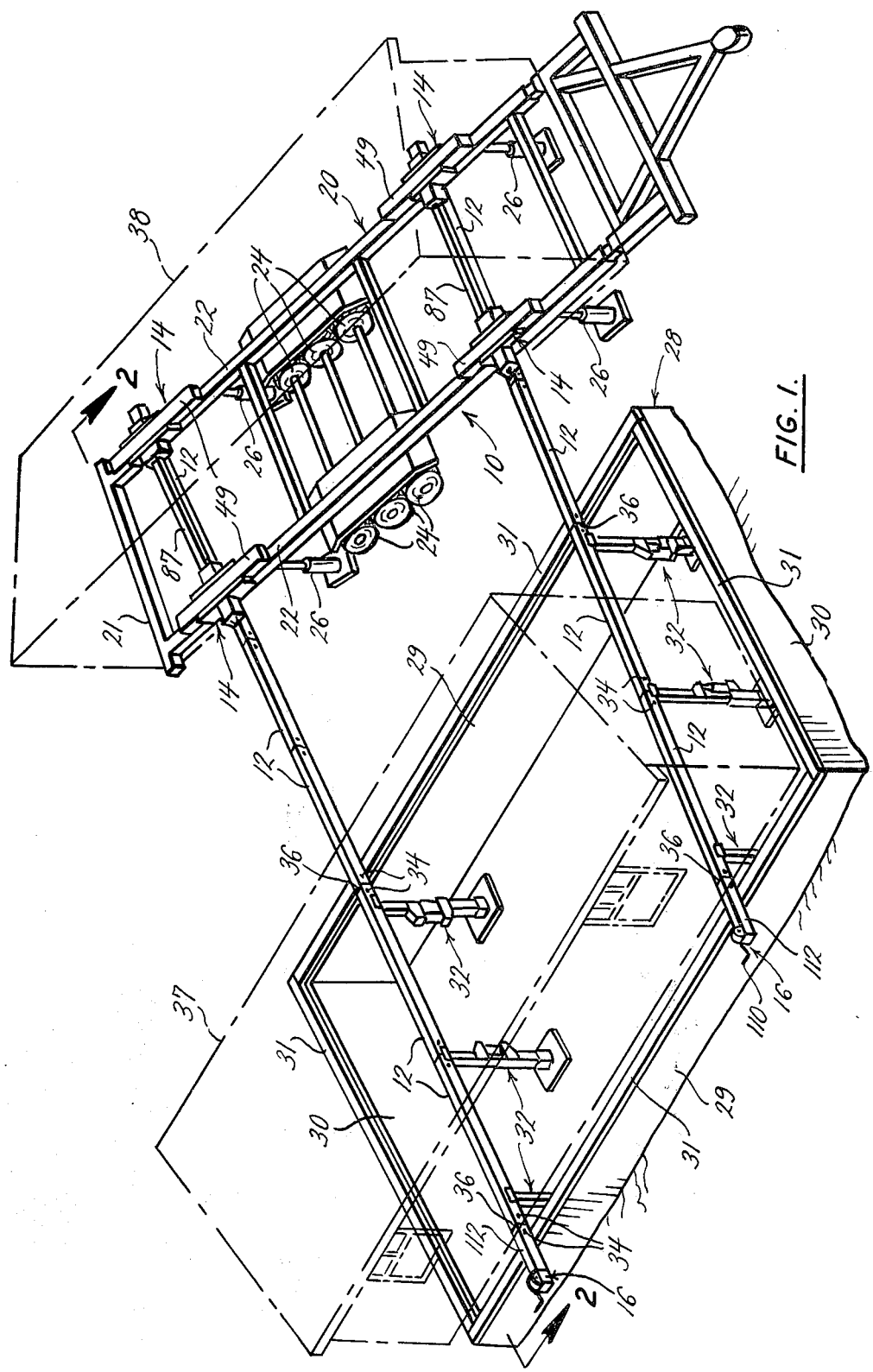
FIG. 1 is an isometric view of a house foundation and a transporter showing the system and method of this invention, one module of a prefabricated house being shown in broken line on the foundation, and another module of the prefabricated house being shown in broken line on the transporter and ready for movement onto the foundation.

Referring to the drawings more particularly by reference numerals, there are illustrated a tractor-drawn transporter generally designated by the reference numeral 10, roller track segment 12 of square cross section, four six-way adjustment roller pads 14, two winch assemblies 16, and track connectors 18 (FIGS. 9 and 10) of square cross section, all constructed in accordance with the teachings of the present invention.

The transporter 10 is of frame construction and includes an elongated frame 20 which is extensible by virtue of a tail unit 21 which telescopes into longitudinal frame members 22 and is locked into selected position by any well-known latching unit such as a bolt, pin, or the like. Three axles, each with two pairs of dual wheels 24, support the transporter 10, the number of wheels employed depending on the load requirements. Four hydraulic lift pads 26 are mounted upon the transporter 10 which incorporate hydraulic lines (not shown) connected to suitable power means such as, for example, power means actuated by the engine of the tractor employed to pull the transporter 10, which is conventional equipment. The transporter 10 described is one preferred design, but certainly other suitable transporters could also be used.

With particular reference to FIG. 1, two spaced parallel articulated lengths of roller track segments 12 extend across the elongated transporter frame 20, span the space between the transporter 10 and a prefabricated house foundation 28 having side walls 29 and end walls 30, and extend across the side walls 29 of the foundation 28. The segments 12 rest upon a wooden cap 31 and are supported between the side walls 29 by jacks 32. The track connectors 18 telescope into abutting track segments 12 and are removably secured in position by clevis pins 34 and retaining cotter pins 35 (FIGS. 1, 9, and 10). The track segments 12 between the side walls of the foundation terminate at abutting joints 36 just inside the inner surfaces of the side walls 29 for purposes to be described.

Again referring to FIG. 1, the four six-way roller pads 14 are shown mounted on the two links of articulated track segments 12 supporting a second module 37 of a prefabricated house, the first module 38 thereof being shown in precision aligned position on the parallel articulated roller track segments 12 awaiting final positioning on the cap 31.

Referring to FIGS. 9 through 11, each six-way roller pad 14 includes an upper fabricated body section 40 and a lower fabricated body section 41. The upper section 40 has two parallel side plates 43, each including a central notch 44 in the lower edge thereof the notch 44 being somewhat wider than the width of the lower section 41. The side plates 43 are spaced apart and held together by a horizontal plate 45 welded between the side plates 43 at the tops of the notches 44 such that the lower surface of the plate 45 extends slightly below the tops of the notches. The plate 45 has an aperture 46 therein at its center. A roller assembly 47 is mounted between the side plates 43 on each side of the notch 44 with the roller surfaces extending slightly above the upper surface of the plate 45. A roller track segment 49 is disposed on the roller assemblies 47 for adjustment generally transversely of the links of the roller track segments 12 as will be more clearly described.

The lower body section 41 of each of the six-way roller pads 14 includes parallel side plates 54 each having a central notch 55 in the upper edge thereof, the notch 55 being somewhat wider than the overall width of the upper body section 40. The side plates 54 have flared ends 56 and are spaced apart and held together by a horizontal plate 57 connected between the side plates 54 at the bottom of the notch 55, the upper surface of the plate 57 being slightly above the bottom of the notch 55. Reinforcing plates 59 are welded between the flared ends 56 of the side plates 54 for added support. A roller assembly 60 is rotatably mounted between the side plates 54 on each side of the notch 55 with the roller surfaces being slightly below the lower surface of the plate 57. The roller assemblies 60 ride on the track segments 12, the side plates 54 extending below the roller assemblies 60 to guide the six-way roller pad 14 in its movement along the track segments 12. The inside width of the lower body section 40 is slightly greater than the width of the track segments 12 to allow free movement thereover. A pin 65 is welded to and extends upward from the plate 57 at its center, and a pull loop 66 is welded to one plate 59.

The upper body section 40 is disposed transversely of the lower body section 41 with the notch 44 placed within the notch 55, with the pin 65 extending into the aperture 46 of the plate 45, and with the lower surface of the plate 45 resting on the upper surface of the plate 57. With the upper body section 40 so positioned relative to the lower body section 41, and with the notch 44 being somewhat wider than the width of the lower section 41, and the width of the notch 55 being somewhat wider than the width of the upper section 40, the upper section 40 is free to pivot about the pin 65 several degrees each way from normal to the lower section and hence the track segments 12. This unique capability is of significant importance as will be described.

An adjustment assembly 70 (FIGS. 4 and 11 through 13) is provided on one of the roller pads 14 for axially moving its roller track segment 49, which assembly 70 includes a yoke assembly 71 pivotally mounted on a clevis pin 72 supported by and between the plates 43 adjacent one roller assembly. One end of a rotatably screw shaft 74 extends through an aperture in a yoke element of the yoke assembly 51 and is maintained against withdrawal by a collar 78 secured thereto. Secured near one end of the track segment 49 is a screw rider unit 80 which threadedly receives the screw shaft 74. The other end of the screw shaft 74 is formed at 82 to receive a ratchet tool 84 for selectively rotating the screw shaft 74 to axially move the track segment 49 and a house module thereon.

Hence, the one roller pad 14, having the adjustment assembly 70, has its roller track 49 fixed for a particular setting of the screw shaft 74 to effectively fix the transverse position of the module resting thereon in relation to that roller pad. However, the roller track segment 49 of the other three roller pads 14 are free to adjust transversely to variations in spacing between the track segments 12 as the modules are moved thereover. The upper body section 40 and therefore the track segments 49 of all of the roller pads 14 are free to make angular adjustments as necessary for proper alignment of the module with the foundation.

There is also included a bar 87 connected between the roller pads 14 on each track. The connection is made by use of track connectors 88 welded to the plates 59 at the ends of the lower body sections 41 opposite the pull loops 66, and by use of pins 89 for connecting the bar 87 to the track connectors. The purpose for the bar is to prevent a roller pad 14 from rolling freely should it not bear part of the load as where the tracks are uneven.

A turnbuckle assembly 90 is provided at selected ones of the pads 14 (FIGS. 2, 3, and 5 through 8) which is connected between the pad 14 and the track segment 12 after the first modular unit 37 is positioned over the foundation to hold the first modular unit securely in place while the second modular unit 38 is moved over the track and positioned. The turnbuckle 90 is of a conventional type having oppositely threaded bolts 91 with eyelets 92 at their outer ends, the bolts being screwed into opposite ends of a suitably threaded elongated hex nut 93. One end of the turnbuckle 90 is attached to the lower section 41 of the roller pad 14 by means of a pin 95 welded to and extending outwardly from the end of one of the side plates 54 and into the eyelet 92. The end of the turnbuckle 90 is held onto the pin 95 by means of a cotter pin 97 extending through aligned holes in the pin 95 and eyelet 92. The other end of the turnbuckle 90 is secured to the track segment 12 by means of a pin 99 having a head 100, which pin extends through the eyelet 92 and suitable apertures in the track segment 12, and is held therein by means of a cotter pin 101.

The turnbuckles 90 provide rigid, yet adjustable, connections between the pads 14 and track segments 12 to securely fix the position of the pad and hence the modular unit on the track. They are useful, for example, to prevent movement of the first module due to wind while the second module is moved into position.

Each winch assembly 46 is of conventional construction. Referring to FIGS. 1, 2, and 14, the winch assembly 16 includes a U-shaped base 105 supporting a cable drum 106 by rotatable shaft 107. A cable 108 is wound on the drum 106. A handle 110 is removable connected to one end of the shaft 107. A suitable lock (not shown) of a type commonly known in the art is provided to hold the drum 106 against reverse winding under tension on the cable 108 upon release of the handle 110. The winch assembly 16 is bolted to a winch support 112 which is of the same square cross section as the roller track segments 12, and which is mounted in abutting relation to a roller track segment 12 by means of a track connector 18 and clevis pins 34. The free end of the cable 108 is secured to a hook 114, which engages the pull hook 66 (FIG. 9).

Each jack 32 has a base portion 116, a telescoping upper portion 117, and a hydraulic cylinder 118 connected by brackets 119 between the base and upper portion to raise or lower the upper portion relative to the lower portion of the jack. A U-shaped cradle 120 is mounted at the top of the jack to receive the track segments 12.

OPERATION

To move and properly align the modular units 37 and 38 onto the foundation 28, a transporter 10, with the first module 37 mounted thereon is positioned generally parallel to the side walls of the foundation as shown in FIG. 1. It is one of the novel features of this invention that this paralleling need not be exact, and this is a very practical consideration since due to the inherent nature of the equipment and the rough terrain near the job site, exact paralleling is virtually impossible and would certainly be very tedious and time consuming. Hence, for the purposes of this illustration, it is assumed that the transporter is not exactly parallel with the side walls of the house foundation.

With the module 37 in position on the transporter, the track segments 12 and the roller pads 14 are positioned as shown between the module and transporter. It is to be understood that the module 37 may not, and most likely will not, be aligned exactly with the frame of the transporter, which also is not required with this invention. One way to position the track segments 12 and roller pads 14 between the module and transporter is to lower the jacks 26 to lift both the transporter and module. Blocks or the like are then inserted between the ground and the module, and the jacks raised to separate the transporter from the module so that the track segments 12 and roller pads 14 can be positioned therebetween. With the track and pads in place, the transporter is again lifted with the jacks 26 to again support the module so that the blocks can be removed. When the transporter is lifted the second time, it is made generally even with the top of the foundation as shown in FIG. 2. Next, the other track segments 12 are positioned between the transporter and the foundation and across the side walls 29 of the foundation as shown in FIG. 1.

It does not matter where the roller pad 14 having the adjustment assembly 70 is positioned, but it is preferable to position it so that it will be near an outside wall of the foundation after the module is in place for easy access in making final adjustments.

The hook 114 of the winch assembly 16 is placed in the eyelet 66 attached to the roller pads 14 nearest the foundation and then by operating the winch assemblies 16 the first module 37 is pulled over the track segments 12 and positioned with its long outside wall aligned with the furthest side wall 29 of the foundation.

It is one of the primary features of this invention that the track segments 12 need not be exactly parallel making precise measurements unnecessary. In fact, the tracks can be aligned by simply eyeballing. Any misalignment is compensated by the six-way roller pads 14. Furthermore, it is not necessary that the module 37 be parallel to the side walls 29 of the foundation prior to movement over the tracks 12 since such misalignment is also compensated by the six-way roller pads 14.

As heretofore described, the roller track segment 49 of the roller pad 14 having the adjustable assembly 70 remains fixed for a given position of the screw shaft 74, which effectively fixes the transverse position of that portion of the module 37 resting thereon with respect to the track 12. However, as the module moves over the track on the roller pads, the other three pads, each having a roller track segment 49 which is free to move transversely on the rollers 48 with respect to the roller pad upper and lower sections 40 and 41, automatically adjust for variations in track alignment, such as where the tracks are nonparallel, preventing any binding between the roller pads and the track and making it extremely easy to move the module over the track. In automatically making this adjustment the roller track segments 49 of the other three roller pads remain fixed with respect to the module since the module is resting thereon, but as the distance between the spaced segments of the tracks varies, the roller pad sections 40 and 41, which are adapted to move over the rails 12, are also allowed to move back or forth as necessary with respect to the roller track segments 49. Also, if as the module 37 is moved over the tracks 12 it becomes necessary to parallel the module with the side walls 29 of the foundation, this may be easily accomplished by simply turning the module as necessary, the turning and paralleling being made easy by the rotation capability of the upper section 40 relative to the lower section 41 about the pin 65 of each of the roller pad assemblies 14.

Thus, in this manner the long outside wall of the module 37 is precisely aligned with the side wall 29 of the foundation. The end walls of the module are then aligned with the end walls 30 of the foundation by adjusting the screw shaft 74. Thus, by adjustment of the screw shaft 74 and operation of the winches 16, precise alignment can be achieved between the module and the foundation because of the automatic adjustment capabilities of the six-way roller pad assemblies 14. After the module 37 is properly positioned, it may be fastened in place by use of the turnbuckles 90.

With the module 37 in proper alignment over the foundation and supported by the jacks 32, a second module 38 is similarly pulled over the tracks 12 by use of the hooks 114 and the winch assemblies 16, and it too is properly aligned over the foundation and with respect to the first module 37. As best shown in FIGS. 2 and 3, the track segment joints 36 are located just inside the walls 29 of the foundation, so that with the track segments 12, roller pads 14 and modules 37 and 38 supported by the jacks 32 as shown in FIG. 2, the track segments 12 between the transporter and the foundation, and the winch supports 112 can be easily disconnected from the track segments 12 over the foundation by simply removing the pins 34. By lowering the jacks 32, the tracks 12, pads 14, and modules 37 and 38 are lowered until the modules rest in precise alignment on the cap 31. The outer ends of track segments 12 clear the walls 29 of the foundation as the jacks are lowered. After removing the turnbuckles 90, further lowering of the jacks 32 allows removal of the roller pads 14 and track segments 12.

From the foregoing, it is obvious that a novel method and system has been described for moving and aligning modular units onto a foundation, which eliminates the problems caused by misalignment of the tracks and of the modular units relative to the foundation, and which otherwise fulfills the objects of this invention.

Various changes and modifications may be made in this invention, as will be readily apparent to those skilled in the art. Such changes and modifications are within the scope and teaching of this invention as defined by the claims appended hereto.

What is claimed is:

1. A method of transferring a module unit from a transporter to a module foundation comprising the steps of positioning the transporter supporting the module unit alongside the foundation, placing spaced tracks between the transporter and module so as to extend across the foundation, mounting six-way roller pads between the module and the tracks such that the module is supported on the pads, each pad having roller means for movement of the pads along the tracks and transverse movement of the module relative to the tracks, and each pad further including means providing rotation of the module relative to the tracks about a generally vertical axis, moving the module along the tracks to its final position on the foundation, transversely adjusting the position of the module as necessary before the tracks and pads are removed, and removing the tracks and pads from between the module and the foundation.

2. A method of transferring a module unit from a transporter to a module foundation comprising the steps of positioning the transporter supporting the module unit alongside the foundation, placing spaced tracks between the transporter and module so as to extend across the foundation, mounting six-way roller pads between the module and the tracks such that the module is supported on the pads, each pad having roller means for movement of the pads along the tracks and transverse movement of the module relative to the tracks, and each pad further including means providing rotation of the module relative to the tracks about a generally vertical axis, moving the module along the tracks to its final position on the foundation, rotating the module relative to the tracks as necessary before the tracks and pads are removed, and removing the tracks and pads from between the module and the foundation.

3. The method of claim 2 further including the step of transversely adjusting the position of the module as necessary before the tracks and pads are removed.

4. The method of claim 2 further including the step of adjusting the height of the bottom of the module as it rests on the transporter, tracks, and pads to generally the same level as the top of the foundation.

5. The method of claim 2 further including the steps of raising the transporter and module, supporting the module independent of the transporter, lowering the transporter sufficiently to allow placement of the tracks and pads between the transporter and module, and again raising the transporter such that the module is completely supported thereon with the tracks and pads therebetween.

6. A method of transferring two module units from transporters to a module foundation comprising the steps of positioning a first transporter supporting a first module unit alongside the foundation, placing spaced tracks between the transporter and module so as to extend across the foundation, the tracks being comprised of track segments joined together, the track segments over the foundation terminating at joints spaced from the opposite inner walls of the foundation which they span, supporting the track segments between the foundation walls to carry the load of the module units, mounting a first set of six-way roller pads between the module and the tracks such that the module is supported on the pads, each pad having roller means for movement of the pads along the tracks and transverse movement of the module relative to the tracks, and each pad further including means providing rotation of the module relative to the tracks about a generally vertical axis, moving the module along the tracks, precisely aligning the first module in position over the foundation, the first module being supported on the track segments between the walls of the foundation, positioning a second transporter supporting a second module unit alongside the foundation, placing spaced track segments between the second transporter and second module unit, joining these last named track segments to the track segments on which the first module unit is supported, mounting a second set of six-way roller pads between the second module unit and the tracks such that the second module unit is supported on said second set, each pad of the second set having roller means for movement of the pad along the tracks and transverse movement of the module relative to the tracks, and each further including means providing rotation of the module relative to the tracks about a generally vertical axis, moving the second module unit along the tracks, precisely aligning the second module unit in proper position relative to the first module unit over the foundation, the second module unit also being supported on the track segments between the walls of the foundation, removing the track segments extending over the top of and outside the walls of the foundation, lowering the track segments within the walls of the foundation together with the pads and module units supported thereon until the module units rest on the foundation to allow removal of the track segments and pads beneath the module units, the ends of the track segments between the foundation walls clearing the walls as the track segments are lowered, and removing the track segments and pads.

* * * * *